(12) United States Patent
Bright et al.

(10) Patent No.: US 7,247,024 B2
(45) Date of Patent: Jul. 24, 2007

(54) METHOD FOR SPATIALLY DISTRIBUTING A POPULATION

(75) Inventors: Edward A. Bright, Knoxville, TN (US); Budhendra L. Bhaduri, Knoxville, TN (US); Phillip R. Coleman, Knoxville, TN (US); Jerome E. Dobson, Lawrence, KS (US)

(73) Assignee: UT-Battelle, LLC, Oak Ridge, TN (US)

( * ) Notice: Subject to any disclaimer, the term of this patent is extended or adjusted under 35 U.S.C. 154(b) by 553 days.

(21) Appl. No.: 10/455,105

(22) Filed: Jun. 5, 2003

(65) Prior Publication Data

US 2004/0101810 A1 May 27, 2004

Related U.S. Application Data

(60) Provisional application No. 60/428,616, filed on Nov. 22, 2002.

(51) Int. Cl.
*G09B 25/06* (2006.01)
(52) U.S. Cl. .................. 434/130; 434/118; 434/306; 434/365; 709/223
(58) Field of Classification Search ............... 434/118, 434/130, 306, 365, 433; 273/308; 705/1, 705/2, 9, 10; 709/223; 455/12.1; 342/357.07; 235/385; 379/127.01
See application file for complete search history.

(56) References Cited

U.S. PATENT DOCUMENTS

| | | | | |
|---|---|---|---|---|
| 5,588,048 | A * | 12/1996 | Neville | 379/127.01 |
| 5,772,213 | A * | 6/1998 | McGlew | 273/308 |
| 5,778,345 | A * | 7/1998 | McCartney | 705/2 |
| 6,298,328 | B1 * | 10/2001 | Healy et al. | 705/10 |
| 6,590,526 | B1 * | 7/2003 | Grube et al. | 342/357.07 |
| 6,942,146 | B2 * | 9/2005 | Pfutzenreuter et al. | 235/385 |
| 6,975,999 | B2 * | 12/2005 | Moore | 705/9 |
| 7,123,918 | B1 * | 10/2006 | Goodman | 455/446 |
| 2002/0128858 | A1 * | 9/2002 | Fuller | 705/1 |
| 2002/0198760 | A1 * | 12/2002 | Carpenter et al. | 705/10 |

(Continued)

OTHER PUBLICATIONS

Jerome E. Dobson et al., "LandScan: A Global Population Database for Estimating Populations at Risk", Photogrammetric Engineering & Remote Sensing, vol. 66, No. 7, Jul. 2000, pp. 849-857.

(Continued)

*Primary Examiner*—Joe H. Cheng
(74) *Attorney, Agent, or Firm*—Akerman Senterfitt; Gregory A. Nelson; Peter A. Chiabotti

(57) ABSTRACT

A process for spatially distributing a population count within a geographically defined area can include the steps of logically correlating land usages apparent from a geographically defined area to geospatial features in the geographically defined area and allocating portions of the population count to regions of the geographically defined area having the land usages, according to the logical correlation. The process can also include weighing the logical correlation for determining the allocation of portions of the population count and storing the allocated portions within a searchable data store. The logically correlating step can include the step of logically correlating time-based land usages to geospatial features of the geographically defined area. The process can also include obtaining a population count for the geographically defined area, organizing the geographically defined area into a plurality of sectors, and verifying the allocated portions according to direct observation.

13 Claims, 2 Drawing Sheets

U.S. PATENT DOCUMENTS

| | | | |
|---|---|---|---|
| 2003/0027522 A1* | 2/2003 | Valdivia et al. | 455/12.1 |
| 2003/0182171 A1* | 9/2003 | Vianello | 705/9 |
| 2004/0088392 A1* | 5/2004 | Barrett et al. | 709/223 |

OTHER PUBLICATIONS

Budhendra Bhaduri et al., "LandScan: Locating People is What Matters", Geo Informatics, Apr./May 2002, pp. 34-35, 37. (Also available at http://www.geoinformatics.com/issueonline/issues/2002/april_2002/pdf_april/34_37_article.pdf).

Jerome E. Dobson, "War is God's Way of Teaching GIS", Jun. 2002, available at <http://merrill.ku.edu/publications/2002whitepaper/dobson.html>, 4 pages.

Eddie A. Bright, "LandScan Global Population 1998 Database", Aug. 2002, available at <http://www.ornl.gov/gist/projects/LandScan/landscan_doc.htm>, 15 pages.

"ORNL Technologies for Energy Infrastructure Assurance", Oak Ridge National Laboratory Review, vol. 35, No. 2, Jun. 2002, available at <http://www.ornl.gov/ORNLReview/vol35_2_02/infrastructure.shtml>, 9 pages.

Budhendra Bhaduri et al., "LandScan USA: A High Resolution Population Distribution Model", Abstract in Program for Interface 2002 Conference, Apr. 17-20, 2002, Montreal, Canada. p. 50. (Also at http://www.galaxy.gmu.edu/interface/I02/I2002Proceedings/BhaduriBudhendra/BhaduriBudhendra.abstract.pdf).

Budhendra Bhaduri et al., "LandScan USA: Developing a High Resolution Day-Night Population Distribution", Abstract in Program for the 22nd Annual ESRI International User Conference, Jul. 8-12, 2002, San Diego, California. (http://gis.esri.com/library/userconf/proc02/abstracts/a0642.html).

Susan Perlin et al., "LandScan USA: Improving How We Count Populations at Risk for Homeland Security Needs", Abstract in Proceedings for EPA Science Forum 2003: Partnering to Protect Human Health and the Environment, May 5-7, 2003, Washington, DC.(http://www.epa.gov/ord/scienceforum/PDFs/security/perlin_s.pdf).

Budhendra Bhaduri et al., "Enhancing Cancer Research with LandScan USA: A High-resolution Population Distribution Model", Abstract, Annual Mtg of Association of American Geographers, Mar. 5-8, 2003, New Orleans, LA. (http://convention.allacademic.com/aag2003/view_paper_info.html?pub_id=1394&part_id1=14077).

* cited by examiner

METHOD FOR SPATIALLY DISTRIBUTING A POPULATION

CROSS REFERENCE TO RELATED APPLICATION

Under 35 USC §119(e) this application claims the benefit of U.S. Provisional Application No. 60/428,616 entitled LandScan USA, filed on Nov. 22, 2002, the entirety of which is now incorporated herein by reference.

STATEMENT REGARDING FEDERALLY SPONSORED RESEARCH OR DEVELOPMENT

The United States Government has rights in this invention pursuant to Contract No. DE-AC05-00OR22725 between the United States Department of Energy and UT-Battelle, LLC.

FIELD OF THE INVENTION

The present invention relates to modeling census data, and more particularly, to modeling population distribution based geospatial data.

BACKGROUND OF THE INVENTION

Censuses provide a generally simple, and often used, form of collecting population data of a particular region. Since ancient Roman times, controlling bodies utilized censuses for a variety of reasons, such as counting the population that lives in a particular region. While the data collected in a simple census provides useful information, the lack of logical correlation of the population data to other factors of the region other than the boundaries of the region, limits the potential extractable information from the population data. Censuses generally report the aggregate number of people residing in a region. These regions typically include entire towns, cities, states, and even countries, each of which contain vast amounts of land area where no population lives. Consequently, simple censuses of relatively large regions provide little, if any, information regarding where individual members of a population generally live within that large region.

In many instances, people who constitute the population of a region live in highly populated areas of that region, leaving other areas of that region relatively unpopulated. Nevertheless, simple censuses do not account for the reality of densely populated sub-regions and sparsely populated sub-regions that are within a larger region. While a simple census provide some usefulness in determining the aggregate number of people residing in a region, some simple censuses inherently limit a systematic correlation of the location of a population throughout that region.

To account for the inherent limitations of a simple census, some methods have been developed to systematically distribute members of a region with a known population to sub-regions within a region. Past methods attempted to distribute members of a population based upon geographic features. Such a geographic correlation suffers from inherent limitations due to the relatively large size of geographic features when compared to the living area of an individual member of a population. For example, some methods correlate a higher incidence of population within a given region for areas with close proximity to such geographical features as impervious surfaces represented by roads, houses, and other features. Other geographic features that have been used to correlate incidence of population within a certain region include slope, land cover type, and intensity of nighttime lights. Nevertheless, such individual spatial relationships cannot reliably predict a population distribution for various reasons.

First, the relationship of the proximity of a relatively densely populated subregion to geographic features varies from region to region. For example, in a typical metropolis, there may be a positive correlation between the proximity of a densely populated sub-region to a major road. For example, correlating a road to population density would distribute the population census for the shown region to be concentrated around the road. While this may be an accurate description in some regions, in other regions an opposite correlation may exist such as a desert region having vast road networks with little population. Additionally, in a farmland region, there may be a negative correlation between the proximity of a populated sub-region to a major road. Further, in a suburban region, no correlation may exist between the proximity of a relatively densely populated sub-region to a major road. Therefore, while geographic features can provide a useful correlation for distributing a population within a certain region, individual geographic features alone do not provide a predictable and reliable relation for distributing a population.

Additionally, while censuses usually limit data collection to locations where members live, even correlations with geographic regions do not account for the reality of transient populations. In the mobile world of today, transient populations exist on town, city, or even state level. Many people travel at least a few miles to work everyday, yet spend most of their nights in another location. Therefore, transient populations produce an affect on day time verse night time populations, an affect that is exacerbated with refinement of the region's resolution.

A system that accounts for spatial and temporally refined population distribution data can provide a more accurate presentation of the population distribution for day or night. Such accurate information provides beneficial uses in a variety of applications in counter-terrorism, homeland security, consequence analysis, epidemiology, exposure analysis, urban sprawl detection, estimation of populations affected by global sea level rise, and emergency planning and management for natural disasters, nuclear, biological, and chemical accidents. Terrorism, natural disasters, and technological accidents can strike anywhere on earth, yet can have impacts on limited areas, such as neighborhoods, city blocks, and even buildings. Population distribution estimates on such a fine resolution help in planning for and responding to such events.

SUMMARY OF INVENTION

The present invention relates to a process for distributing a population count within a geographically defined area. The process can include the step of logically correlating land usage to geospatial features of the geographically defined area. Portions of a population count can be allocated to regions of the geographically defined area having associated land usages, according to the logical correlation. The allocations subsequently can be stored within a searchable data store. Notably, the step of logically correlating land usages to geospatial features of the geographically defined area can include logically correlating time-based land usages to geospatial features of the geographically defined area. Preferably, the logical correlation of land usages to geospatial features can be weighed for determining the allocation of portions of the population count.

In a preferred aspect of the invention, a population count can be obtained for a geographically defined area. Additionally, the geographically defined area can be organized into a multiplicity of sectors. Consequently, portions of the population count can be allocated to at least one sector. In this regard, the sector can include a thirty (30) arc resolution and a three (3) arc second resolution. In any case, the allocation can optionally be verified according to direct observation. Finally, the process can be expressed as one of a computer program product.

BRIEF DESCRIPTION OF THE DRAWINGS

A fuller understanding of the present invention and the features and benefits thereof will be accomplished upon review of the following detailed description together with the accompanying drawings, in which.

DETAILED DESCRIPTION OF THE PREFERRED EMBODIMENTS

Geospatial features can include the geographic location and characteristics of natural and constructed features and boundaries of the earth and can include human bestowed characteristics, such as naming a geographically defined area. A non-exhaustive list of geospatial features can include transportation networks, such as roads, waterways, railroads, subways, and the like, slope of the land surface, night time lights, and land cover, such as desert, arid grasslands, forests, water, wetlands, cultivated lands, man-made structures and the like. A geographically defined area, by comparison, can include any land or water mass having natural boundaries, political boundaries, or arbitrarily assigned boundaries.

Unlike geospatial features in a geographically defined area, "land usage" can refer to any form of interaction with geospatial features within the geographically defined area. In this regard, land usage refers to qualitative and quantitative human interaction with the geospatial features within the geographically defined area. For instance, land usage can describe general uses, such as industrial uses, residential uses, and agricultural uses, exhibited for a given geographically defined area, irrespective of geospatial features. Land usage characterizations differentiate between buildings that appear relatively similar to one another based upon satellite imagery.

For example, a land usage characterization can differentiate between a building used for a house, where typically one family resides, a building used as a factory, where typically no members reside during nighttime hours but is highly populated during daytime hours, and a prison, where a vast number of residents reside within a confined space, even where the buildings appear identical in satellite imagery. Hence, while a building, no matter what the use of the building may be, can be viewed as relatively the same as other buildings, as seen in the previous example, the actual land usage (i.e. the use of the building) is vital for accurately distributing a population count in a geographically defined area.

Figure 1:
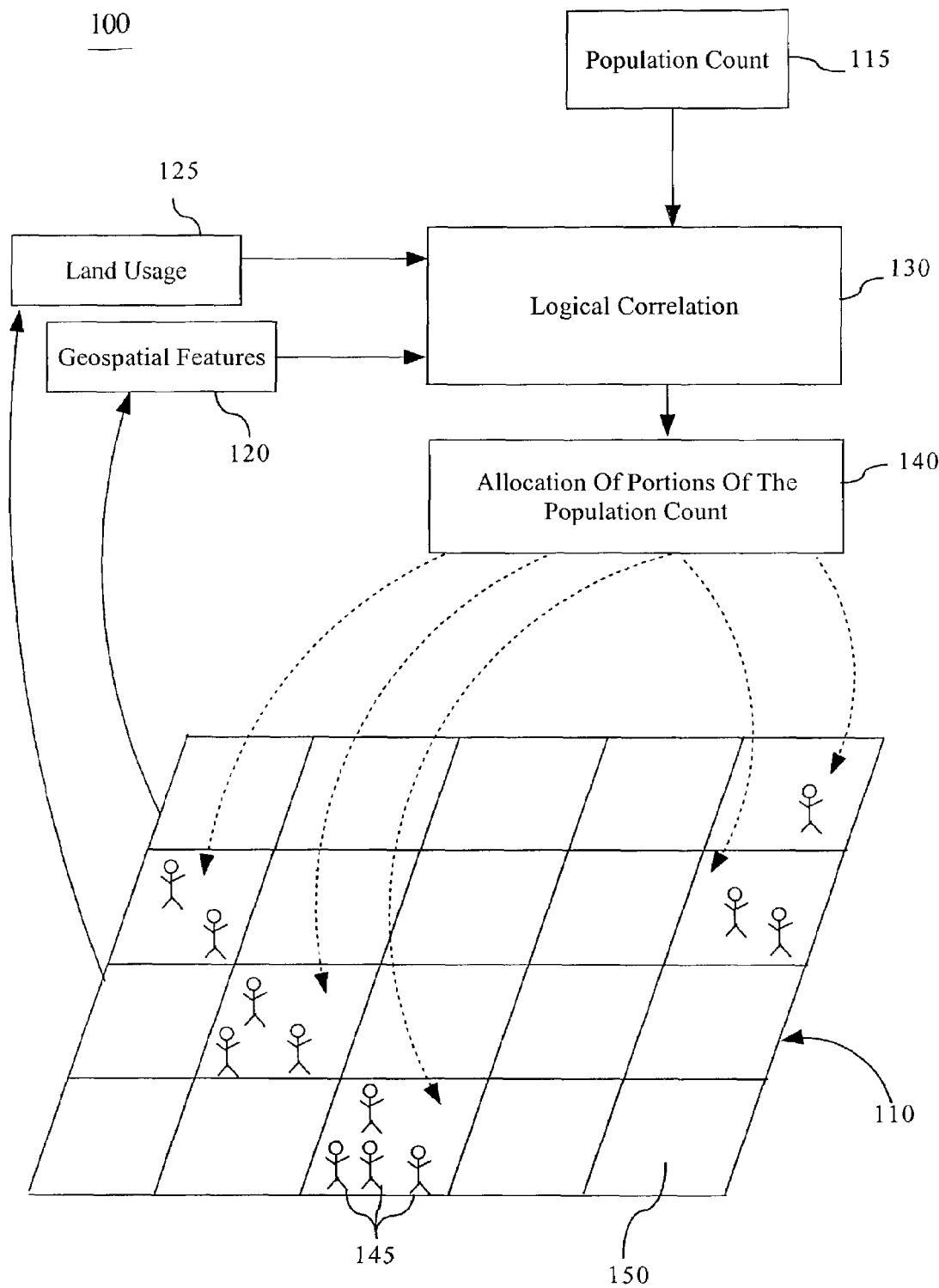
FIG. 1 is a schematic diagram helpful in illustrating a process for distributing a population within a geographically defined area in accordance with the inventive arrangements.

FIG. 1 is a schematic diagram helpful in illustrating a process 100 for spatially distributing a population count within a geographically defined area in accordance with the inventive arrangements. For any given geographically defined area 110, the population count 115 can be obtained through a variety of sources, such as a government census, and through a variety of methods, such as a direct count, estimation, and other methods. The geographically defined area 110 can have geospatial features 120, such as transportation networks, rivers, lakes, slope, elevation, rivers, buildings, forests, and the like. Additionally, within the geographically defined area 110, a variety of land usages 125 can exist, such as residential usages, agricultural usages and industrial usages.

The relationship between the land usages 125 and the geospatial features 120 from the geographically defined area 110 can be used to form a logical correlation 130. The logical correlation 130 characterizes the relationship between the land usages 125 and the geospatial features 120. For a geographically defined area with a variety of geospatial features 120 and land usages 125, a multitude of logical correlations 130 can exist. Each logical correlation 130 can include a type of land usage 125 that occurs proximate to and in connection with one or more geospatial features 120. Therefore, the logical correlation 130 can include multiple logical correlations 130 for the same geospatial feature 120 having multiple land usages 125.

The logical correlation 130 of land usages 125 with geospatial features 120 can be used for the allocation 140 of portions of the population count to the geographically defined area 110. In operation, portions of the population count, such as individual members 145 of the population and portions defined by a percentage of the population count, can be allocated 140 to regions of the geographically defined area 110 as shown by the dotted lines pointing to particular regions of the geographically defined area 110.

Optionally, the geographically defined region 110 can be organized into a multitude of sectors 150 for simplifying the allocation 140 of portions of the population count 115, as shown in FIG. 1. Here, the sectors 150 are shown as uniform squares to form a grid-based organization where all the sectors 150 are approximately the same shape and the same size. Nevertheless, the invention is not limited to square shaped sectors 150 as any appropriately shaped sector 150 can be used. Notably, the shape and size of the sectors can be dependent upon available resolution of satellite imagery, and therefore, the sectors 150 can include an area of the earth's surface corresponding to a thirty (30) arc second resolution and a three (3) arc second resolution.

Figure 2:
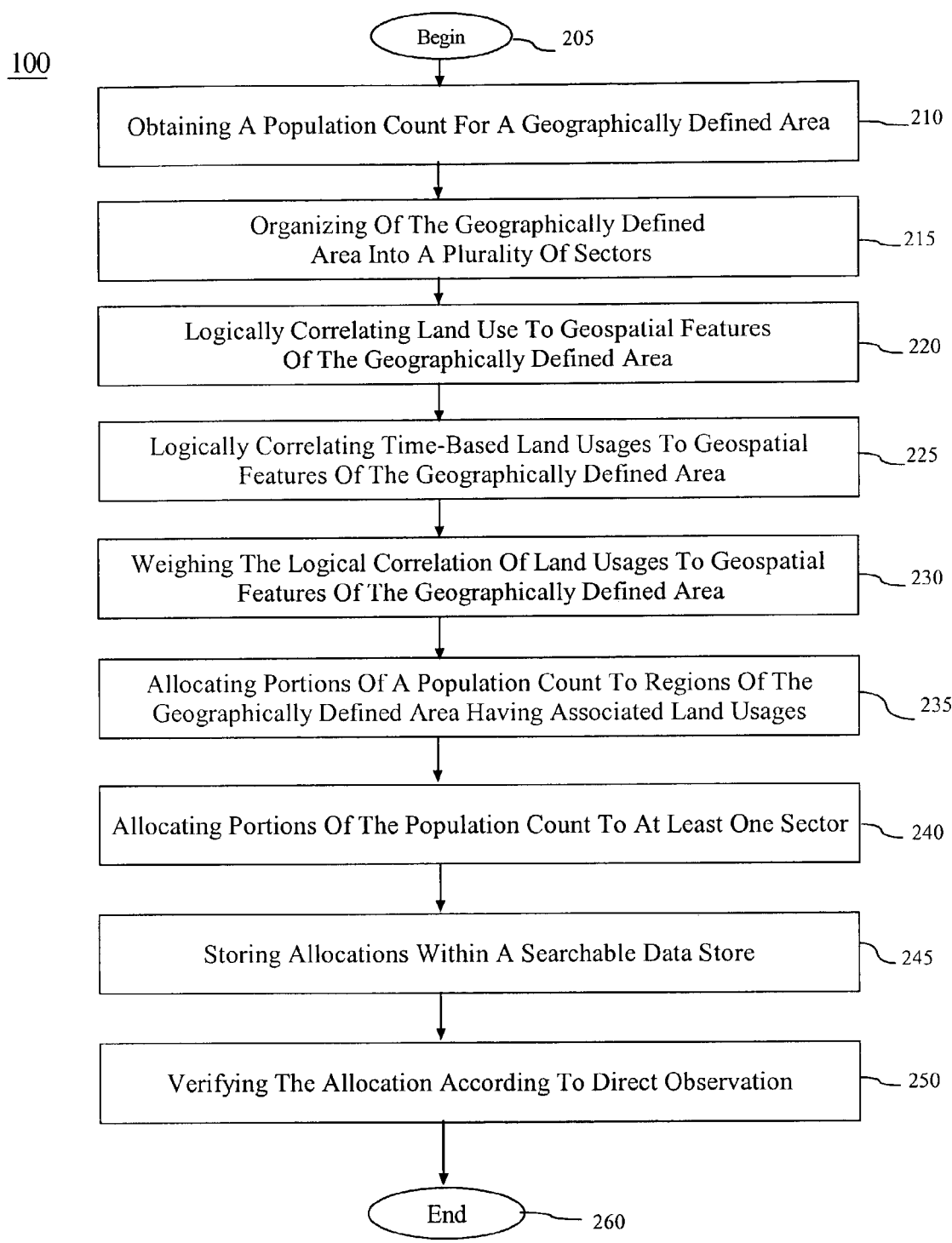
FIG. 2 is a flow chart illustrating a process for distributing a population within a geographically defined area in accordance with the inventive arrangements.

Turning to FIG. 2, the flow chart presents a more detailed illustration of the process described above, including variations and different embodiments. The process 200 can begin at block 205 for any geographically defined area having geospatial features and associated land usages. In block 210, a population count can be obtained for a geographically defined area. Specifically, a population count for geographically defined area can be obtained via a direct count, estimation, or from a source, such as an official government census.

In block 215, the geographically defined area can be organized into a plurality of sectors. In this regard, a grid-like organization can be provided in which all sectors have both the same shape and also the same size. Additionally, the grid like organization can provide sectors that cover equal areas of the geographically defined region.

Alternatively, the shape of the sectors within a geographically defined area can also be tailored to reflect the geospatial features present. The geographically defined area can also be organized as one sector mimicking the shape and size of the geographically defined area. Furthermore, the sectors can include sectors that can be dependent upon available satellite imagery, and therefore, the sectors can include an area of the planet's surface corresponding to a thirty (30) arc second resolution and even three (3) arc second resolution. Portions of the population count of an entire geographically defined area can be allocated to sectors as will be discussed below.

In block 220, land usage can be logically correlated to geospatial features of the geographically defined area. Logically correlating land usage to geospatial features can include determining the types of land usages that occur proximate to and in connection with geospatial features. For instance, residential land usages can be logically correlated to buildings used for housing. In another example, agricultural land usages can be logically correlated to crop fields. Further, agricultural land usages can also be logically correlated to buildings adjacent to or within the crop fields. Additionally, logically correlating land usage to geospatial features can include characterizing a unique relationship between the land usage and the geospatial features for the geographically defined area. Differences in economic, physical, political, and cultural factors necessitate a unique relationship for at least geographically defined areas within different jurisdictional boundaries.

In addition to logically correlating land usage to geospatial features, block 225 can include logically correlating time-based land usage to geospatial features of the geographically defined area. For many geospatial features, the land usage varies dependent upon the time of day. Significantly, land usage can include transportation uses, indicating a high likelihood of members of population present during peak traffic times, residential uses, indicating a high likelihood of members of a population present during night time hours, and industrial uses, indicating a high likelihood of members of a population count present during work hours but a low likelihood of members of a population count present during night time hours.

For example, many people commute to New York City on a daily basis, but do not live within the bounds of New York City. Consequently, this daily flux of people can substantially affect the land usage of geospatial features within and proximate to New York City, such as the use of transportation networks and the use of buildings as offices which will experience a greater use during business hours. In turn, the time-based land usage can substantially affect the population depending upon at what time the population is counted. In another example, the population of a steep slope can vary greatly depending on the time the population is counted, such as where a mountain for skiing can exhibit a high population during the day and the low to zero population during the night. In such an instance, logically correlating time-based land usage to the geospatial feature can produce significant differences in the population distribution.

In block 230, the logical correlation of land usage to geospatial features of the geographically defined area can be weighed. For example, the land usage logically correlated with a road can include a weighing for the distance of the land usage to the road. Similarly, other land usages logically correlated with geospatial features can be weighed; however, distance is not the only factor used and other factors such as intensity, area, and density can be used. The geospatial features and the land usages can both be assigned values used to calculate a likelihood coefficient. The likelihood coefficient can be used to indicate that the logical correlation of particular land usages in proximity or in connection with geospatial features can increase or decrease the likelihood of members of a population count being present proximate to the geospatial feature. As an example in a given geographically defined region, both land usages and geospatial features indicative of high populations can be assigned relatively high values, which are in turn used to calculate a resulting likelihood coefficient indicative of a high population count for that region of the geographically defined area.

Additionally, the likelihood coefficient can uniquely weigh the logical correlation of geospatial features and associated land usages present within the geographically defined area for at least geographically defined areas within a jurisdictional boundary. Such a unique weighing may be necessary for different geographic regions defined by jurisdictional boundaries due to political, social, and economic differences throughout the world. Thus, while a particular logical correlation may be indicative of a high population distribution within certain parts of the world, the same logical correlation may be indicative of a low population distribution in other parts of the world. For example, while residents in the United States tend to reside at some distance away from major highways, residents in other nations, such as India, tend to reside proximate to major highways. Thus, the, geographically defined area can influence the weighing of the logical correlations.

Additionally, the weighing can be assigned a value. For example, the logical correlation of land usages with geospatial features within the United States that is indicative of low population, such as limited land usage in portions of the Arizona desert, can be assigned a relatively low weighing value, such as a relatively low number. A low weighing value can indicate a lack of population proximate to the geospatial feature. In contrast, the logical correlation of land usages with geospatial features within the United States that are indicative of high population, such as densely developed residential living areas near the California coastline, can be assigned a relatively high weighing value, such as a relatively high number. A high weighing value can indicate a high population proximate to the geospatial feature. It should be noted the values discussed above are merely exemplary and that generally, a wide range of values between low and high weighing values can accommodate the wide range of land usages and geospatial features in a geographically defined area and their influence on population distribution.

To reiterate, the weighing is not based solely on land usages or geospatial features. Instead, the weighing is based on the logical correlation of the land usage with the geospatial feature. Additionally, the weighing is not uniform and can differ for each geographically defined area. Therefore, while in some regions the logical correlation, of a steep slope used as a national park can indicate a lack of human population, in other regions the logical correlation of a steep slope used as an agricultural region can indicate the likelihood of at least a few members of the population are present proximate to the steep slope.

Turning to block 235, portions of the population count can be allocated to the regions of the geographically defined area having associated land usages. Allocating portions of the population count can affectively distribute members of the population proximate to geospatial features with logically correlated land usages indicative of population. Generally, portions of the population can be allocated to regions so that the aggregate of the portions will equal the complete population count for the geographically defined area. Also generally, greater portions of the population count can be allocated to regions of the geographically defined area having land usages, such as residential uses, indicative of a relatively greater population in contrast to regions having land usages, such as agricultural uses, indicative of relatively less population.

Additionally, if the geographically defined area has been organized into a plurality of sectors in block 215, portions of the population count can be allocated to a sector in block 240. Allocating portions of the population count to sectors can be advantageous, particularly when the geographically defined regions are relatively large regions. Allocating portions of the population count to sectors can also be advantageous, when a geographically defined region contains multiple geospatial features covering small portions of the geographically defined area while having logically correlated land usages that are strongly indicative of either high or low population. Additionally, in a situation where the geographically defined region has been organized into a plurality of sectors based on the latitude and longitude, such as 30 arc second sectors and even 3 arc second sectors, portions of the population count can be allocated on a sector by sector basis. Geographic allocation to relatively small geographic regions selectively distributes portions of the population count and allows a determination of the location of small portions of the population. Such a determination can be helpful to predict portions of population involved in events that affect only a small region.

In block 245, allocations can be stored within a searchable data store. The data store can include any suitable form of memory including a hard drive, ROM, RAM, Flash Memory, a cluster, a server, and the like. Storing the allocations within a searchable data store can allow computational analysis of the allocations and provides the information for future reference.

Turning to block 250, the allocations can be verified by direct observation. Verifying the allocations can include referencing sources with recorded information and can include methodical and systematic "door-to-door" counting of the population in particular regions. Verifying the allocations by direct observation serves as a check on the accuracy of the process 200. Additionally, verifying by direct observation can serve a check on the precision of the resolution of the geographically defined area or sector in which portions of the population count is allocated. For example, a sector can be allocated a portion of the population; however, direct observation can indicate that the actual population distribution within the sector is substantially concentrated to a smaller region within the geographically defined area.

In particular, allocations of low and zero population can be verified by direct observation to ensure accuracy. Some regions within geographically defined areas contain geospatial features with logically correlated land usages that are indicative of low to zero population. While this indication of low to zero population for some regions, such as an area in the middle of a lake, is accurate, some regions still include portions of the population. Such regions can include areas not used by mainstream society and are inadvertently described with inaccurate land usages, such as a park where, in many cities, substantial numbers of homeless people can be found. Therefore, verification by direct observation can ensure that the reality of population distribution is accounted for in the allocations. Process 200 can end at block 260 or can begin again by returning to block 205.

The present invention can be realized in hardware, software, or a combination of hardware and software. Computer software which can be included as part of the present invention can be realized in a centralized fashion in one computer system, or in a distributed fashion where different elements are spread across several interconnected computer systems. Any kind of computer system, or other apparatus adapted for carrying out the methods described herein, is suited.

A typical combination of hardware and software could be a general purpose embedded computer system with a computer program that, when being loaded and executed, controls the computer system such that it carries out the methods described herein. Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A method for estimating a population count distribution within a geographically defined area, the method comprising the steps of:

logically correlating land usages to geospatial features in said geographically defined area;

allocating portions of the population count to regions of said geographically defined area having said land usages, according to said logical correlation; and estimating a distribution of the population count in accordance with said geospatial features within said geographically defined area, wherein the steps are performed by computer hardware in accordance with at least one computer software program that is executable by said computer hardware, and wherein the at least one computer software program is stored in a memory readable by said computer hardware.

2. The method according to claim 1, wherein said logically correlating step comprises the step of logically correlating time-based land usages to geospatial features of said geographically defined area.

3. The method according to claim 1, further comprising the step of obtaining a population count for said geographically defined area.

4. The method according to claim 1, further comprising the step of organizing said geographically defined area into a plurality of sectors.

5. The method according to claim 4, wherein said allocating step comprises allocating portions of the population count to at least one said sector.

6. The method according to claim 4, wherein said sectors comprise a thirty (30) arc second resolution.

7. The method according to claim 4, wherein said sectors comprise a three (3) arc second resolution.

8. A method according to claim 1, further comprising the step of verifying said allocated portions according to direct observation.

9. The method according to claim 1, further including the step of weighing said logical correlation for determining said allocation of portions of the population count.

10. A machine readable storage having stored thereon a computer program comprising a routine set of instructions for performing the steps of:

logically correlating land usages to geospatial features in said geographically defined area;

allocating portions of the population count to regions of said geographically defined area having said land usages, according to said logical correlation; and estimating a distribution of the population count in accordance with said geospatial features within a geographically defined area, wherein the steps are performed by computer hardware in accordance with the computer program that is executable by said computer hardware.

11. The machine readable storage of claim 10, further comprising the steps of:

storing said allocated portions within a searchable data store;

obtaining a population count for said geographically defined area;

organizing said geographically defined area into a plurality of sectors;

allocating portions of the population count to at least one said sector;

verifying said allocated portions according to direct observation; and weighing said logical correlation for determining the allocation of portions of the population count.

12. The machine readable storage of claim 10, wherein the logically correlating step comprises the step of:

logically correlating time-based land usages to geospatial features of said geographically defined area.

13. The machine readable storage of claim 11, wherein the organizing step comprises the step of:

organizing sectors of at least one of thirty (30) arc second resolution and three (3) arc second resolution.

* * * * *